Sept. 4, 1928.

J. E. SCESE

BRAKE ADJUSTMENT

Filed July 12, 1926

1,683,057

Inventor
John E. Scese

By Blackmore, Spencer & Hail
Attorneys

Patented Sept. 4, 1928.

UNITED STATES PATENT OFFICE.

JOHN E. SCESE, OF PONTIAC, MICHIGAN, ASSIGNOR TO GENERAL MOTORS CORPORATION, OF DETROIT, MICHIGAN, A CORPORATION OF DELAWARE.

BRAKE ADJUSTMENT.

Application filed July 12, 1926. Serial No. 121,876.

This invention relates to brakes and more specifically to a band brake operable upon a drum.

The invention is designed for application to a band brake member carried by a part rigid with the vehicle and contractible upon a drum carried by a vehicle wheel. It will be understood, however, that the invention is not restricted to this particular application.

The object of the invention is a provision of means to take up the slack in the brake band, and furthermore, to take up the slack automatically. It is well known that after use the brake linings become worn and too great a pedal movement is required to actuate the brakes. In fact, the range of movement possible may be such that the band cannot be brought into sufficiently close engagement with the drum to provide safe braking action. To avoid the necessity of manual adjustment the structure of this invention aims to effect automatically the adjustment of the band.

For the accomplishment of the above and other objects the invention is embodied in the structure shown in the drawings and described in the complete specification below.

Figure 1:
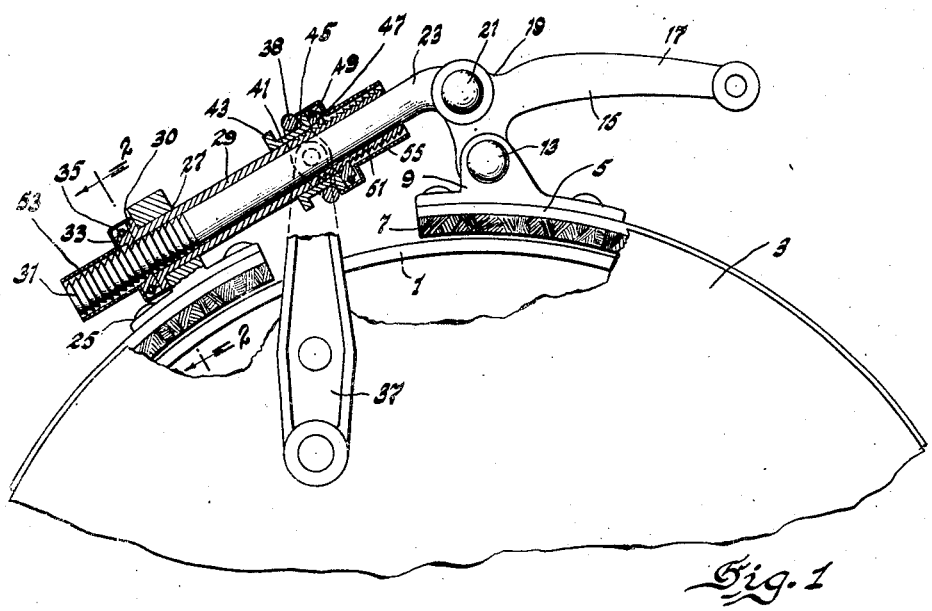
Figure 1 is a side elevation of a drum and band embodying my slack adjusting arrangement.
Figure 2:
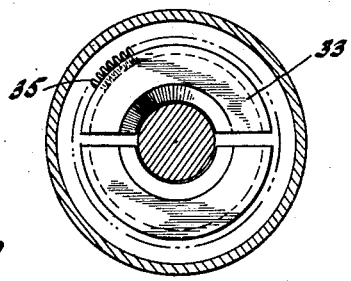
Figure 2 is a section on line 2—2 of Figure 1.

Referring by reference characters to the drawing, numeral 3 represents a plate rigidly carried with the axle. This plate closes a drum 1, which, in the usual vehicle arrangement, is carried by the rotating wheel. A band 5 is shown surrounding the drum and carries the usual friction lining 7. A lug 9 is secured to one of the two adjacent ends of the band. This lug carries a pivot 13 for a lever 15 having a long arm 17 by which it is operated and a short arm 19 by which it is connected to a rod 23 through the aid of a pivot 21.

The other end of the band has a similar lug 25. This lug is apertured as at 27 and through the aperture rod 23 passes. Surrounding the rod 23 is an elongated sleeve 29. This sleeve also extends through opening 27 and is provided with an annular flange 30 which engages the lug carried by part 25, as clearly shown in Figure 1. This rod 23 is formed with clutch teeth 31 and the pair of semi-circular pawl members 33 surround and are in clutch engagement with said teeth. These pawl members 33 are positioned adjacent to the side of flange 30. For holding the semi-circular pawl members yieldingly together and in engagement with teeth 31 there is shown a coil spring 35. This spring is received in a groove surrounding the members 33. The yielding action of the spring makes possible a one-way movement of the members 33 along the teeth of rod 23.

On the plate 3 is an arm 37 having at its upper end an eye 38 through which is slidingly mounted a short sleeve 41 having end flanges 43 and 45 which limit its sliding movement. Engaging flange 45 is a split pawl 47, the halves being held by spring 49. This pawl structure is like that represented by numeral 33 except that its tooth is oppositely shaped. It engages with teeth 51 on sleeve 29 as shown in Figure 1. Mounted upon the flange 30 of sleeve 29 is a housing 53 enclosing the members 33 and the end of rod 23. A similar housing 55 is carried by flange 45 of sleeve 41 and encloses the dog 47.

The lever 15 operates the brake in the usual manner. In its clockwise rotation it first turns about pivot 21 and applies the end of the band beneath pivot 13 to the drum. Thereafter the lever swings about pivot 13 and pulls the other end of the band against the drum. Should the band be worn the slack take up feature of the construction comes into action. A more than normal clockwise movement of 17 is necessary to bring the second mentioned end of the band against the drum. During this movement the sleeve 41 has moved with the sleeve 29 until its flange 43 engages the eye 38, whereupon the sleeve 41 is held from further movement with sleeve 29. There is then a relative movement between sleeve 41 and sleeve 29 and the pawl 47 being held by sleeve 41 slides over the teeth of sleeve 29, taking up the slack in the band. In a similar way upon a releasing counter-clockwise movement of lever 15 the eye 38 may engage shoulder 45 of sleeve 41 and the further movement of rod 23 causes the sliding engagement between pawl 33 and the teeth 31. In this way slack in both ends of the brake band is taken care of automatically.

I claim:

1. In a band brake, a drum, a contracting band, a lever pivoted to one end of the band, a rod connected to said lever for applying the opposite end of the band to the drum, a plurality of automatic slack adjustment devices associated with said rod.

2. Slack adjusting means for band brakes comprising means for contracting the band, said means having a direct pivotal connection at one end of the band and a rod connection with the other end, said rod connection comprising slack take up mechanism automatically operable in one direction of rotation of said means, an independent slack take-up mechanism associated with said rod operable in the reverse direction of rotation of said means.

3. Slack adjusting means for band brakes comprising means for contracting the band, said means having a direct pivotal connection with one end of the band, and a rod connection with the other end, said rod having teeth, pawl means engageable with said teeth whereby the rod may move freely relative to said second end in one direction, but which insures movement of said second end of the band by said rod in its opposite direction of movement.

4. In a band brake, comprising a lever pivoted to one end of the band, means to operatively connect said lever to the other end of the band including a slack adjusting means, a fixed guide for said means, and slack adjusting mechanism mounted adjacent said guide and cooperating with said first adjusting means.

5. In a band brake, a band having its ends adjacent, a lever pivoted to one end thereof, a rod pivoted to said lever, a guide for said rod, two cooperating adjusting means to automatically take up slack, one located at the connection of said rod with the second brake band end and the other located adjacent the guide, the two slack adjusting means having a common part.

6. In a band brake, a band, an operating means connected to one part of said band, a first member connected with said operating member for applying a braking force to the other end of said band, a second member movable relative to said first member through which the force applied by said first member is delivered to said second mentioned end, means associated with said second member to prevent said relative movement in one direction, a third member having a limited movement axially of said first member and provided with means for preventing relative movement of said second and third members in one direction.

7. In a band brake having a lever and an operating rod, a sleeve surrounding said rod having means to movably engage an end of the band, mechanism carried by said sleeve and engageable with said rod at a plurality of points to take up slack.

8. In a band brake, a lever and an operating rod connected thereto, means by which the rod moves one end of the band, said means including a sleeve surrounding the rod, a second sleeve having a limited movement surrounding the first sleeve, and means by which the second prevents the movement of the first sleeve in one direction of relative movement.

9. In a band brake, a rod having teeth at one end, a sleeve surrounding the rod having teeth at its end remote from the toothed end of the rod, a second sleeve having a predetermined limited movement, a pawl carried by said second sleeve and engaging the teeth of the first sleeve, and a pawl carried by the first sleeve and engaging the teeth of the rod.

10. In a band brake, a band operating lever pivoted to one end of the band, an operating rod connected thereto for applying the other end of the band, a lug on said other end, means engaging said lug, pawl and ratchet means between said rod and said engaging means, a member having a determined limited movement axially of said rod, and pawl and ratchet means between said member and said engaging means.

In testimony whereof I affix my signature.

JOHN E. SCESE.